(12) United States Patent
Shelton

(10) Patent No.: US 11,815,384 B2
(45) Date of Patent: Nov. 14, 2023

(54) DEVICE FOR CLEANING OIL GAUGING EQUIPMENT

(71) Applicant: R&B INDUSTRIES, LLC, Vernal, UT (US)

(72) Inventor: Benjamin Shelton, Vernal, UT (US)

(73) Assignee: Benjamin Shelton, Vernal, UT (US)

( * ) Notice: Subject to any disclaimer, the term of this patent is extended or adjusted under 35 U.S.C. 154(b) by 0 days.

(21) Appl. No.: 17/751,262

(22) Filed: May 23, 2022

(65) Prior Publication Data

US 2022/0373378 A1 Nov. 24, 2022

Related U.S. Application Data

(60) Provisional application No. 63/191,483, filed on May 21, 2021.

(51) Int. Cl.
*G01F 23/04* (2006.01)
*B08B 1/00* (2006.01)

(52) U.S. Cl.
CPC ............ *G01F 23/045* (2013.01); *B08B 1/002* (2013.01)

(58) Field of Classification Search
CPC ...... G01F 23/04; G01F 23/045; B38B 1/0002
USPC .......................................................... 33/725
See application file for complete search history.

(56) References Cited

U.S. PATENT DOCUMENTS

| | | | | |
|---|---|---|---|---|
| 2,779,045 A | | 1/1957 | Harvey | |
| 2,855,682 A | * | 10/1958 | Norgard | G01F 23/045 33/725 |
| 3,387,314 A | * | 6/1968 | Shirk | G01F 23/045 15/220.4 |
| 3,460,181 A | * | 8/1969 | Denver | G01F 23/045 73/290 R |
| 4,380,841 A | * | 4/1983 | Thomas | G01F 23/045 15/220.4 |
| 5,018,237 A | * | 5/1991 | Valley | G01F 23/045 15/250.003 |
| 7,325,270 B2 | * | 2/2008 | Hinojosa | G01F 23/045 15/210.1 |
| 8,863,348 B2 | * | 10/2014 | Hunskor | B08B 1/00 15/104.04 |
| 11,280,657 B2 | * | 3/2022 | Kurtovic | F01M 11/12 |
| 2008/0072445 A1 | * | 3/2008 | Harrison | G01F 23/045 33/725 |
| 2021/0246816 A1 | * | 8/2021 | Rosenberger | G01F 23/04 |

\* cited by examiner

*Primary Examiner* — George B Bennett
(74) *Attorney, Agent, or Firm* — David Cook; Loyal IP Law, PLLC

(57) ABSTRACT

Disclosed herein is a device that includes a platform and a wiper attached to the platform. The wiper includes an aperture disposed within the platform and a channel. The channel in the platform runs from an outside edge of the platform to an outside edge of the aperture. The wiper also includes an aperture disposed within the wiper and a channel that runs from the outside edge of the wiper to the outside edge of the wiper aperture. The aperture in the wiper is smaller than the aperture in the platform. Also disclose is a device that includes a platform, a wiper attached to the platform, and a brush with bristles attached to the platform.

20 Claims, 4 Drawing Sheets

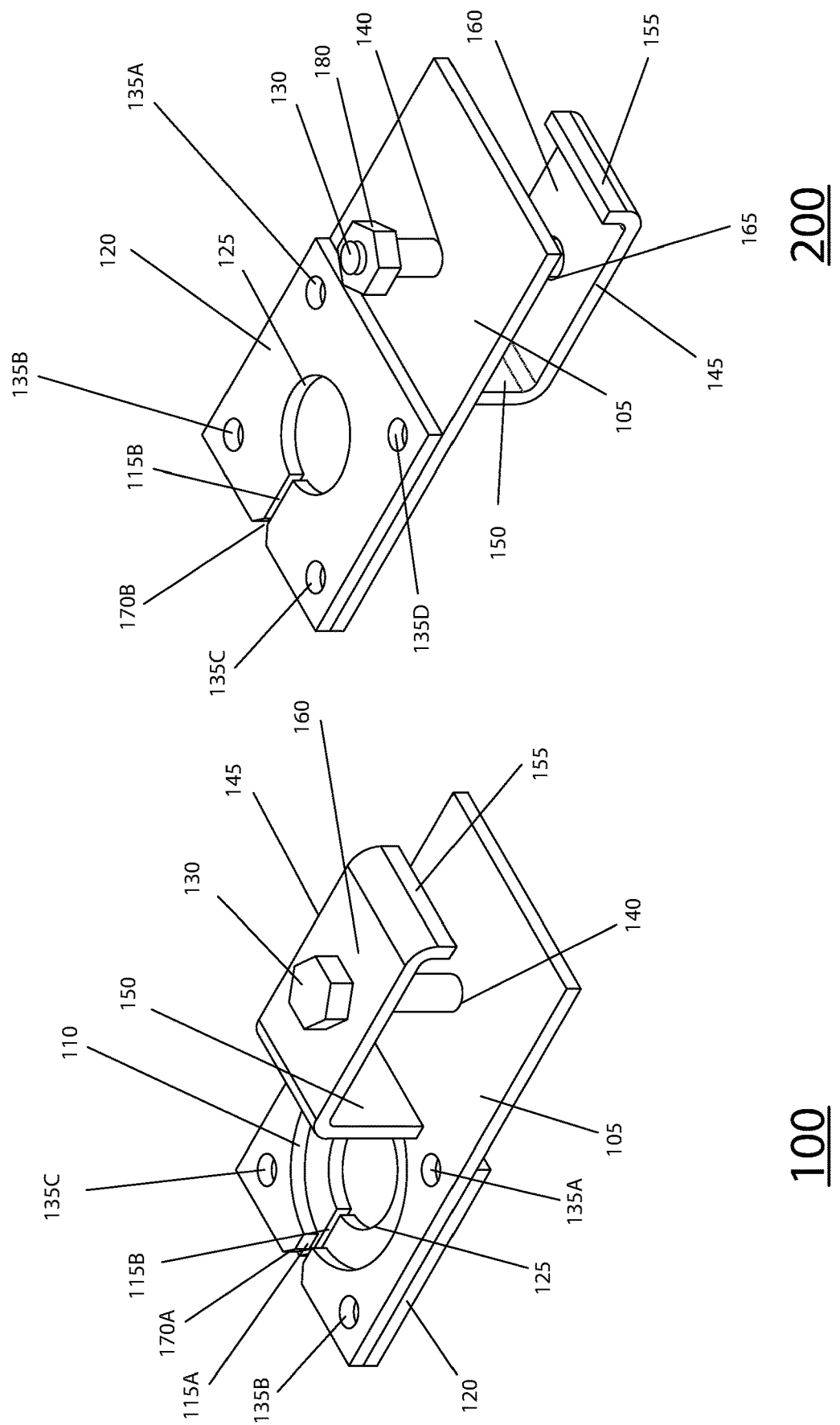

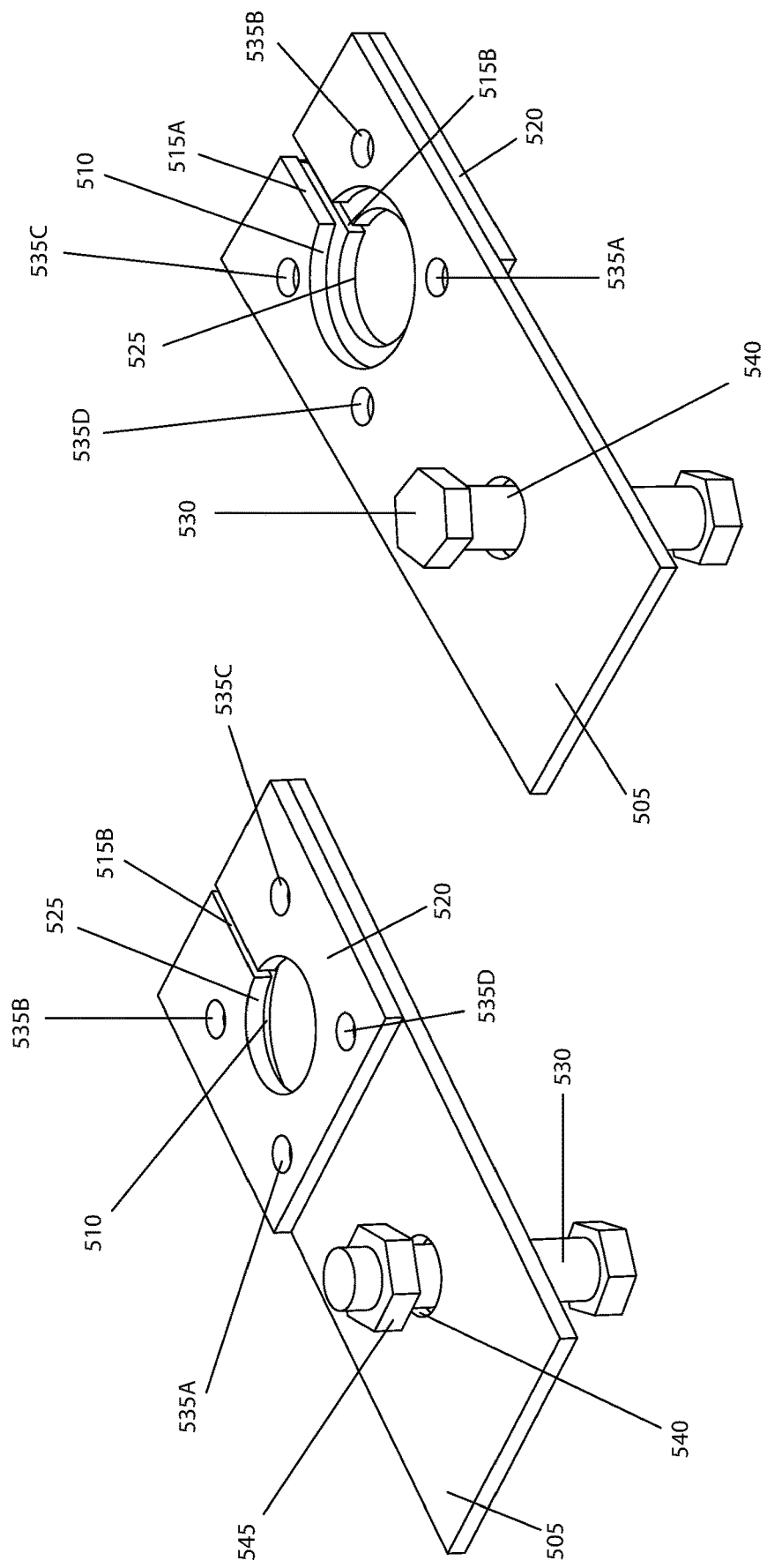

DEVICE FOR CLEANING OIL GAUGING EQUIPMENT

CROSS-REFERENCE TO RELATED APPLICATIONS

This application claims the benefit of U.S. Provisional Application No. 63/191,483, filed May 21, 2021, which is incorporated herein by reference in its entirety, including but not limited to those portions that specifically appear hereinafter, the incorporation by reference being made with the following exception: In the event that any portion of the above-referenced provisional application is inconsistent with this application, this application supersedes said above-referenced provisional application.

TECHNICAL FIELD

The disclosure relates generally to a device to clean oil gauging equipment. The device aids in the wiping off oil and other residue from the oil gauging equipment after being used. The device when used may allow residue removed from the gauging to be directed back into the receptacle being measured.

BACKGROUND

Working with energy producing hydrocarbons such as crude oil, natural gas, gasoline, propane, diesel, kerosene, butane and other chemicals can be challenging. These chemicals require the proper care to provide a clean and safe environment for those workers whose job entails interactions with hydrocarbons and chemicals. Additionally, these chemicals can be harmful to the environment if not properly cared for.

Gauging a tank is a process to determine the amount of fluid (e.g., petroleum and other chemicals) in a tank. Measuring the amount of chemicals in a tank is important for environmental protection, government regulations, quality control and production analysis. Measurement for environmental purposes is important to confirm the integrity of the container to ensure there is no leakage. The United States Environmental Protection Agency ("EPA") has established requirements for storage tanks of petroleum and other hazardous chemicals requiring gauging and recording the volume of chemicals that are stored in a tank. Furthermore, government regulations may include regulating how much petroleum can be pumped from the ground and gauging may be used to track the amount of petroleum within a tank. Gauging tanks can also be used to help determine an amount of water found in the tank with the petroleum. Perhaps the most prevalent reason to gauge a tank is to measure the amount of petroleum in the tank to determine the productivity of the corresponding pump or pumps that store petroleum in a particular tank or receptacle.

The process of manual gauging generally includes a gauging tape that is metal and may further be connected to a brass plumb bob. The metal gauging tape connected to the plumb bob unwinds and dips the plumb bob into the petroleum. The plumb bob is then unwound until it touches the bottom of the container or a datum plate positioned at the bottom of the tank. Then the gauging tape is wound back up to the top of the tank and the point at which the oil residue remains on the gauging tape is recorded. The process is then repeated at subsequent tanks.

Two general methods are used to manage soiled gauging tools. First, soiled gauging equipment may be kept in a soiled state and transferred by a vehicle to be used at the next tank. The second method is to use a rag or a paper towel to wipe the gauging equipment clean. The first method often leaves residue around the top of the tank and down the stairs or ladder and often leaves a trail of hazardous chemicals back to the vehicle. This spreads the potentially toxic chemical around outside of the tank and may further soil the ladder and/or the stairs increasing the likelihood of work-related injuries due to slipping. Furthermore, debris that attaches to the plumb bob and the gauging tape lessen the productivity of the gauging tool and often deposit unwanted debris into the next tank gauged. The second method is cleaner and safer for the worker but the towels and rags are often tossed aside thrown in the trash or require washing. Whether the rags end up as litter, in a landfill or in a washing machine all still negatively impact the environment due to at least residual hazardous material being contained in the rag. Furthermore, the residue cleaned off by towels or rags frequently results in contaminating the environment.

SUMMARY

Disclosed herein is a device that includes a platform and a wiper attached to the platform. The wiper includes an aperture disposed within the platform and a channel. The channel in the platform runs from an outside edge of the platform to an outside edge of the aperture. The wiper also includes an aperture disposed within the wiper and a channel that runs from the outside edge of the wiper to the outside edge of the wiper aperture. The aperture in the wiper is smaller than the aperture in the platform. Also disclose is a device that includes a platform, a wiper attached to the platform, and a brush with bristles attached to the platform.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings:

FIG. 1 illustrates a top perspective view of an exemplary gauge cleaning device.

FIG. 2 illustrates a bottom perspective view of an exemplary gauge cleaning device.

FIG. 5 illustrates a bottom perspective view of an exemplary of a gauge cleaning device.

FIG. 6 illustrates a top perspective view of an exemplary of a gauge cleaning device.

DETAILED DESCRIPTION

Figure 4:
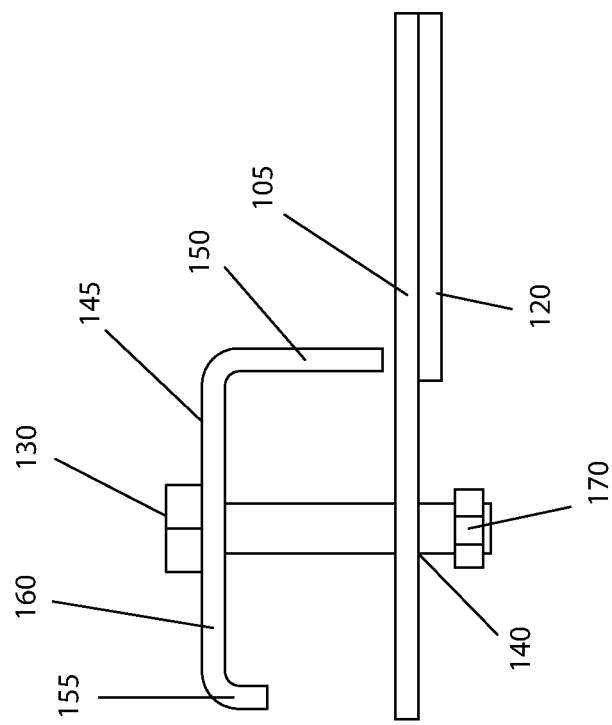
FIG. 4 illustrates a side view of an exemplary gauge cleaning device.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

FIG. 1 illustrates a top perspective view of a gauge cleaning device 100. Device view 100 includes platform 105 that can be made of steel or other various types of material which are known for their tensile strength and resistance to corrosion from hydrocarbons (e.g., crude oil, natural gas, gasoline, propane, diesel, kerosene, and butane). As an alternative to steel, hardened plastics, fiberglass and other material may be used to create platform 105. Platform 105 may include bolt aperture 140 at the proximal end of platform 105 and platform aperture 110 at the distal end of platform 105. Bolt aperture 140 may be sized to accommodate bolt 130 and may include threading to fit corresponding threading of a bolt 130. Platform aperture 110 may be sized to allow a gauging device such as a plumb bob to pass through.

Platform 105 may further include platform channel 115A that runs from an outside edge of platform 105 to an outside edge of platform aperture 110. Platform channel 115A may be sized to allow a gauge tape to pass from the outside of platform 105 to platform aperture 110. In an alternative embodiment, angular recess 170A-B may be located at an outside edge of platform 105 and wiper 120 may be included to funnel a gauge tape to the entrance of platform channel 115A. Wiper 120 may also include an angular recess 170B. In another embodiment, an outcropping may be included on the outside edge of platform 105 and wiper 120 to indicate and direct a gauge tape to the opening of platform and wiper channels 115A-B. Moreover, platform channel 115A and wiper channel 115B may have various angles before opening up to platform aperture 110 and wiper aperture 125 respectively. This may be done to position a gauge tape to be wiped clean within wiper channel 115B.

Device view 100 may include wiper 120 attached to the bottom portion of platform 105. The thickness of wiper 120 may range from 1 to 10 mm thick. Wiper 120 may alternatively be attached to the top portion of platform 105 or both the bottom and the top portions of platform 105. Wiper 120 may include a wiper aperture 125 and wiper channel 115B. Wiper aperture 125 may be a smaller aperture than that of platform aperture 110 found in platform 105. Platform aperture 110 and wiper aperture 125 may be circular. Further wiper aperture 125 may be centered in platform aperture 110 such that an outside edge of platform aperture 110 is equal distance to an outside edge of the wiper aperture 125. Wiper aperture 125 in wiper 120 may include a diameter smaller than a plumb bob being used while gauging in order to contact the plumb bob as it is being pulled through wiper aperture 125 and may include a flexible material, such as rubber, which allows a plumb bob with a larger diameter than wiper aperture 125 to pass through while also maintaining contact with the plumb bob to wipe away residual material from the plumb bob. Further the platform 105 helps create a bending point for wiper 120 as a plumb bob is being pulled through. For example, as a plumb bob is pulled through wiper aperture 125, wiper 120 contacts platform 105 on one side and contacts the plumb bob on the other side aiding in the bending of wiper 120 helping wiper 120 wipes excess material off the plumb bob. The distance from the outside edge of platform aperture 110 to wiper aperture may range from 1 to 20 mm (e.g., wiper aperture 125 may be 23 mm in diameter and platform aperture 110 may be 30 mm in diameter).

Platform channel 115A may extend from an outside edge of platform 105 to platform aperture 110. Wiper channel 115B may be narrower than platform channel 115A. This may be implemented to allow wiper 120 to contact a gauge tape and as the gauge tape is pulled upwards through both platform and wiper channels 115A and 115B wiper 120 may wipe clean excess residue. The wider width of platform channel 115A may help the more flexible wiper channel 115B to bend as a gauge tape is pulled through it. Wiper 120 may be connected to platform 105 using attachments 135 A-135C. Attachments 135 A-C may include but are not limited to screws, bolts, rivets, and/or adhesives. Further attachments 135 A-135C may include apertures that extend through both platform 105 and wiper 120.

Device view 100 may further include clamp 145 to facilitate attachment to the corresponding storage tank/receptacle. Clamp 145 may include clamp body 160 distal arm 150 and proximal arm 155. Clamp body 160 may include bolt aperture 165 that may accommodate bolt 130. Distal arm 150 may be longer than proximal arm 155 allowing pressure to be applied at the proximal end when bolt 130 is tightened. Clamp 145 may attach to a projection in a tank. The projection, welded or attached to the tank, may include an upward turned lip that corresponds to the downward turned proximal arm 155. Alternatively, a tank may include another type of projection and the sizes of arms 150 and 155 may be adjusted to fit the shape of another type of projection. In an alternative embodiment, proximal arm 155 may be eliminated and distal arm 150 may be shortened to correlate to the width of the projection in the tank. Both distal and proximal arms 150 and 155 may be placed at substantially perpendicular to the length of clamp body 160 extending downward towards the top portion of platform 105. Substantially in this context means plus or minus 15 degrees. Distal arm 150 ends before the outer edge of platform aperture 110. Alternatively, the shape of clamp 145 may be altered to allow clamp 145 to attach to a lip in an opening of the storage tank or other receptacle.

FIG. 2 illustrates a bottom perspective view of a gauge cleaning device 200. Device view 200 includes platform 105 that can be made of steel or other various types of material know for their tensile strength and resistance to corrosion from hydrocarbons e.g., crude oil, natural gas, gasoline, propane, diesel, kerosene, butane. As an alternative to steel, hardened plastics, fiberglass and other material may be used to create platform 105. Platform 105 may include bolt aperture 140 at the proximal end of platform 105 and platform aperture 110 (hidden due to perspective) at the distal end of platform 105. Bolt aperture 140 may be sized to accommodate bolt 130 and may include threading to fit corresponding threading of a bolt 130. Alternatively, bolt 130 may include nut 180 attached to the bottom of bolt 130 located on the bottom portion of platform 105. Platform aperture 110 may be sized to allow a gauging device such as a plumb bob to pass through.

Platform 105 may further include platform channel 115A that runs from an outside edge of platform 105 to an outside edge of platform aperture 110. Platform channel 115A may be sized to allow a gauge tape to pass from the outside of platform 105 to platform aperture 110. In an alternative embodiment, angular recesses 170A-B may be located at an outside edge of platform 105 and the outside edge of wiper 120 where the channels 115A and 115B opens to the outside edge of platform 105 and wiper 120. This may be included to funnel a gauge tape to the entrance of platform and wiper channels 115A and 115B. In another embodiment, an outcropping may be included on the outside edge of platform 105 to indicate and direct a gauge tape to the opening of channels 115A and 115B. Moreover, platform and wiper channels 115A-B may have various angles before opening up to platform and wiper aperture 110A-B. This may be done to position a gauge tape to be wiped clean within platform wiper channel 115A-B.

Device view 200 may include wiper 120 depicted attaching to the bottom portion of platform 105. The thickness of wiper 120 may range from 1 to 10 mm thick. Wiper 120 may alternatively be attached to the top portion of platform 105. Wiper 120 may include a wiper aperture 125 and wiper channel 115A. Wiper aperture 125 may be a smaller aperture than that of platform aperture 110 found in platform 105. Platform aperture 110 and wiper aperture 125 may be circular. Further wiper aperture 125 may be centered in platform aperture 110 such that an outside edge of platform aperture 110 is equal distance to an outside edge of the wiper aperture 125. Wiper aperture 125 in wiper 120 may include a diameter smaller than a plumb bob being used while gauging in order to contact the plumb bob as it is being pulled through wiper aperture 125. For example, as a plumb bob is pulled through wiper aperture 125 contacts the plumb bob and wipes excess material off of the plumb bob. Wiper channel 115B may be narrower through the wiper 120 than through platform channel 115A. This may be implemented to allow wiper 120 to contact a gauge tape and as the gauge tape is pulled upwards through wiper channel 115B wiper 120 may wipe clean excess residue while wiper 120 is kept from bending too much by platform channel 115A. Wiper 120 may be connected to platform 105 using attachments 135 A-D. Attachments 135 A-D may include but are not limited to screws, bolts, rivets, and/or adhesives. Further attachments 135 A-D may include apertures that extend through both platform 105 and wiper 120.

Device view 200 may further include clamp 145 to facilitate attachment to the corresponding storage tank/receptacle. Clamp 145 may include clamp body 160 distal arm 150 and proximal arm 155. Clamp body 160 may include bolt aperture 165 that may accommodate bolt 130. Distal arm 150 may be longer than proximal arm 155 allowing pressure to be applied at the proximal end when bolt 130 is tightened. Clamp 145 may attach to a projection in a tank. The projection, welded or attached to the tank, may include an upward turned lip that corresponds to the downward turned proximal arm 155. Alternatively, a tank may include another type of projection and the sizes of arms 150 and 155 may be adjusted to fit the shape of another type of projection.

In an alternative embodiment, proximal arm 155 may be eliminated and distal arm 150 may be shortened to correlate to the width of the projection. Both distal and proximal arms 150 and 155 may be placed at substantially perpendicular to the length of clamp body 160 extending downward towards the top portion of platform 105. Substantially in this context means plus or minus 15 degrees. Distal arm 150 ends before the outer edge of platform aperture 110 (unseen due to perspective). Alternatively, the shape of clamp 145 may be altered to allow clamp 145 to attach to the lip in an opening of the storage tank or other receptacle.

Figure 3:
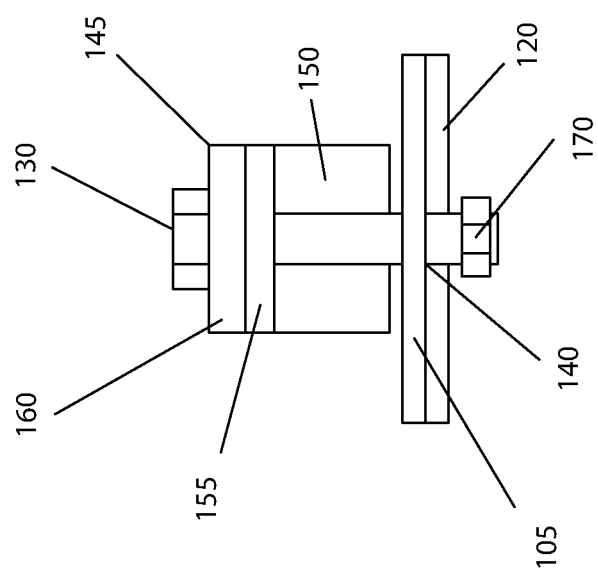
FIG. 3 illustrates a front view of an exemplary gauge cleaning device.

FIG. 3 illustrates a front view of a gauge cleaning device 300. Device view 300 includes platform 105 that can be made of steel or other various types of material know to for their tensile strength and resistance to corrosion from hydrocarbons e.g., crude oil, natural gas, gasoline, propane, diesel, kerosene, butane. As an alternative to steel, hardened plastics, fiberglass and other material may be used to create platform 105. Platform 105 may include bolt aperture 140 at the proximal end of platform 105 and platform aperture 110 (unseen due to perspective) at the distal end of platform 105. Bolt aperture 140 may be sized to accommodate bolt 130 and may include threading to fit corresponding threading of bolt 130. Alternatively, bolt 130 may include nut 180 attached to the bottom of bolt 130 located on the bottom portion of platform 105. Platform aperture 110 may be sized to allow a gauging device such as a plumb bob to pass through.

Device view 300 may further include clamp 145 to facilitate attachment to the corresponding storage tank/receptacle. Clamp 145 may include clamp body 160 distal arm 150 and proximal arm 155. Clamp body 160 may include bolt aperture 165 that may accommodate bolt 130. Distal arm 150 may be longer than proximal arm 155 allowing pressure to be applied at the proximal end when bolt 130 is tightened. Clamp 145 may attach to a projection in a tank. The projection, welded or attached to the tank, may include an upward turned lip that corresponds to the downward turned proximal arm 155. Alternatively, a tank may include another type of projection and the sizes of arms 150 and 155 may be adjusted to fit the shape of another type of projection.

In an alternative embodiment, proximal arm 155 may be eliminated and distal arm 150 may be shortened to correlate to the width of the projection. Both distal and proximal arms 150 and 155 may be placed at substantially perpendicular to the length of clamp body 160 extending downward towards the top portion of platform 105. Substantially in this context means plus or minus 15 degrees. Distal arm 150 ends before the outer edge of platform aperture 110 (unseen due to perspective). Alternatively, the shape of clamp 145 may be altered to allow clamp 145 to attach to the lip in an opening of the storage tank or other receptacle.

FIG. 4 illustrates a side view of a gauge cleaning device 400. Device view 400 includes platform 105 that can be made of steel or other various types of material know to for their tensile strength and resistance to corrosion from hydrocarbons e.g., crude oil, natural gas, gasoline, propane, diesel, kerosene, butane. As an alternative to steel, hardened plastics, fiberglass and other material may be used to create platform 105. Platform 105 may include bolt aperture 140 at the proximal end of platform 105 and platform aperture 110 (unseen due to perspective) at the distal end of platform 105. Bolt aperture 140 may be sized to accommodate bolt 130 and may include threading to fit corresponding threading of bolt 130. Alternatively, bolt 130 may include nut 180 attached to the bottom of bolt 130 located on the bottom portion of platform 105. Platform aperture 110 may be sized to allow a gauging device such as a plumb bob to pass through.

Device view 400 may further include clamp 145 to facilitate attachment to the corresponding storage tank/ receptacle. Clamp 145 may include clamp body 160 distal arm 150 and proximal arm 155. Clamp body 160 may include bolt aperture 165 that may accommodate bolt 130. Distal arm 150 may be longer than proximal arm 155 allowing pressure to be applied at the proximal end when bolt 130 is tightened. Clamp 145 may attach to a projection in a tank. The projection in the tank that may include an upward turned lip that corresponds to the downward turned proximal arm 155. With different projection the sizes of arms 150 and 155 may be adjusted. In an alternative embodiment, proximal arm 155 may be eliminated and distal arm 150 may be shortened to correlate to the width of the projection. Both distal and proximal arms 150 and 155 may be placed at substantially perpendicular to the length of clamp body 160 extending downward towards the top portion of platform 105. Substantially in this context means plus or minus 15 degrees. Distal arm 150 ends before the outer edge of platform aperture 110 (unseen due to perspective). Alternatively, the shape of clamp 145 may be altered to allow clamp 145 to attach to the lip in an opening of the storage tank or other receptacle.

FIG. 5 illustrates a bottom perspective view of an alternate embodiment of a gauge cleaning device 500. Device view 500 includes platform 505 that can be made of steel or other various types of material know to for their tensile strength and resistance to corrosion from hydrocarbons e.g., crude oil, natural gas, gasoline, propane, diesel, kerosene, butane. As an alternative to steel, hardened plastics, fiberglass and other material may be used to create platform 505. Platform 505 may include bolt aperture 540 at the proximal end of platform 505 and platform aperture 510 at the distal end of platform 505. Bolt aperture 540 may be sized to accommodate bolt 530 and may include threading to fit corresponding threading of bolt 530. Alternatively, bolt 530 may include nut 570 attached to the bottom of bolt 565 located on the bottom portion of platform 505. Platform aperture 510 may be sized to allow a gauging device such as a plumb bob to pass through.

Platform 505 may further include platform channel 515A that runs from an outside edge of platform 505 to an outside edge of platform aperture 510 (hidden due to perspective). Platform channel 515A may be sized to allow a gauge tape to pass from the outside of platform 505 to platform aperture 510. Moreover, channels 515A and 515B may have various angles before opening to platform aperture 510 and wiper aperture 525. This may be done to position a gauge tape to be wiped clean within platform and wiper channels 515A-B.

Device view 500 may include wiper 520 depicted attaching to the bottom portion of platform 505. Wiper 520 may have a thickness range from 1 to 10 mm. Wiper 520 may alternatively be attached to the top portion of platform 505. Wiper 520 may include a wiper aperture 525 and a wiper channel 515B. Platform aperture 510 and wiper aperture 525 may be circular. Further wiper aperture 525 may be centered in platform aperture 510 such that an outside edge of platform aperture 510 is equal distance to an outside edge of the wiper aperture 525. Wiper aperture 525 may be a smaller aperture than that of platform aperture 510 found in platform 505. Wiper aperture 525 is sized to contact gauge device such as a plumb bob. For example, as a plumb bob is pulled through wiper aperture 525, wiper 520 contacts the plumb bob on one side and platform aperture 510 on the other, causing a bend against the plumb bob and wipes excess material off the plumb bob. Wiper aperture 525 may be positioned directly below platform aperture 510. Platform aperture 510 and wiper aperture 525 may have a similar rounded shape. Platform aperture 510 having a similar shape only slightly larger allows platform aperture 510 to guide the more flexible wiper aperture 525 around the plum bob as it is being pulled through wiper aperture 525 and platform aperture 510. The distance from the outside edge of platform aperture 510 to wiper aperture may range from 1 to 20 mm (e.g., wiper aperture 525 may be 23 mm in diameter and platform aperture 510 may be 30 mm in diameter). Wiper channel 515B may be narrower through the wiper 520 than through platform channel 515A. This may be implemented to allow wiper 520 to contact a gauge tape and as the gauge tape is pulled upwards through channels 515A and 515B wiper 520 may bend with contact between platform 505 and the upward pull of the gauge tape helping wipe clean excess residue. The distance between the edge of platform channel 515A and the edge of wiper channel 515B may range between 0.5 mm to 10 mm.

Wiper 520 may be connected to platform 505 using attachments 535 A-D. Attachments 535 A-D may include but are not limited to screws, bolts, rivets, adhesives. Further attachments 535 A-D may include apertures that extend through both platform 505 and wiper 520.

FIG. 6 illustrates a top perspective view of an alternate embodiment of a gauge cleaning device 600. Device view 600 includes platform 505 that can be made of steel or other various types of material know to for their tensile strength and resistance to corrosion from hydrocarbons e.g., crude oil, natural gas, gasoline, propane, diesel, kerosene, butane. As an alternative to steel, hardened plastics, fiberglass and other material may be used to create platform 505. Platform 505 may include bolt aperture 540 at the proximal end of platform 505 and platform aperture 510 at the distal end of platform 505. Bolt aperture 540 may be sized to accommodate bolt 530 and may include threading to fit corresponding threading of bolt 530. Alternatively, bolt 530 may include nut 570 attached to the bottom of bolt 565 located on the bottom portion of platform 505. Platform aperture 510 may be sized to allow a gauging device such as a plumb bob to pass through. Further attachments 535 A-D may include apertures that extend through both platform 505 and wiper 520. Device view 600 may attached to a tank by bolting through the storage tank or receptacle or it may further connect by the bolt through a bracket mounted to the side of the tank. Alternatively, device 600 may be attached to the side of an opening in the tank using the bolt or other attachment methods.

Platform 505 may further include platform channel 515A that runs from an outside edge of platform 505 to an outside edge of platform aperture 510. Channels 515A and 515B may be sized to allow a gauge tape to pass from the outside of platform 505 and wiper 520 to platform aperture 510 and wiper aperture 525. In another embodiment, an outcropping may be included on the outside edge of platform 505 and wiper 520 to indicate and direct a gauge tape to the opening of channels 515A and 515B. Moreover, channels 515A and 515B may have various angles before opening to platform aperture 510 and wiper aperture 525. Various angles in channel 515A and 515B may aid in positioning a gauge tape facilitating the wiping off of residue attached to the gauge tape.

Device view 600 may include wiper 520 depicted attaching to the bottom portion of platform 505. Wiper 520 may alternatively be attached to the top portion of platform 505. Wiper 520 may include a wiper aperture 525 and channel 515B. Wiper aperture 525 may be an aperture of a smaller diameter than that of platform aperture 510 found in platform 505. Wiper aperture 525 is sized to contact gauge device such as a plumb bob. For example, as a plumb bob is pulled through wiper aperture 525 contacts the plumb bob and wipes excess material off the plumb bob. Platform channel 515A may extend through platform 505 and channel 515B may extend through wiper 520. Wiper channel 515B that extends through wiper 520 may be narrower than platform channel 515A that extends through platform 505. This may be implemented to allow wiper 520 to contact a gauge tape. For example, as the gauge tape is pulled upwards through channel 515B wiper 520 may bend at the contact between the outside edge of channel 515A to help wipe clean excess residue from the gauge tape. Wiper 520 may be connected to platform 505 using attachments 535 A-D. Attachments 535 A-D may include, but are not limited to screws, bolts, rivets, and adhesive. Further attachments 535 A-D may include apertures that extend through both platform 505 and wiper 520. Device view 600 may attached to a tank by bolting through the storage tank or receptacle or it may further connect by the bolt through a bracket mounted to the side of the tank.

An exemplary implementation of the cleaning device may include first attaching cleaning device 100 or 500 to the storage tank using a bolt or the clamp to attach to a portion of the storage tank e.g., to the rim of an opening, or a projection, or a bracket or to a side of the tank. After gauging the tank using an exemplary metal tape and a brass plumb bob. A user may move the metal tape to the channel openings and then a user may wind up the plumb bob while positioned in the channels 515A-B allowing the residue found on the metal tape to be cleaned. Alternatively, if in a hurry, a user may pass through channels 515A-B and continue to real in the plumb bob using the outside edge of wiper 520 to wipe one side of the metal tape. When the plumb bob reaches the platform aperture 510 and wiper aperture 525 the plumb bob contacts wiper 520 as it is pulled through platform aperture 510 and wiper aperture 525. Wiper 520 bends against the upward force of the plum bob and the downward force of the platform, cleaning residue from the plum bob. After removing the gauging device, the residue cleaned from the gauging device may drip back into the tank or receptacle from which it was drawn.

Figure 7:
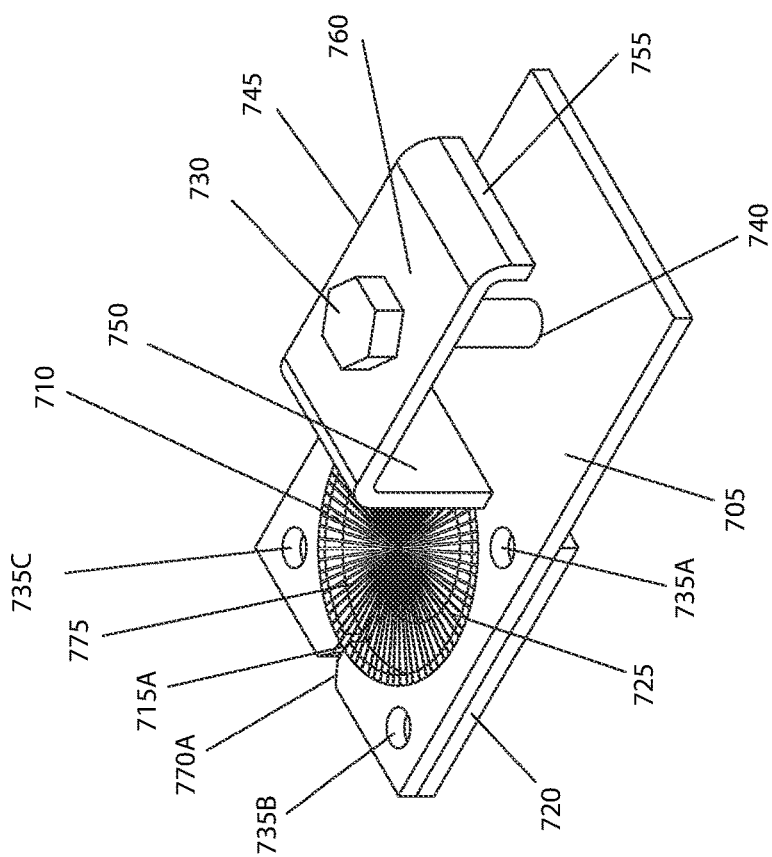
FIG. 7 Illustrates a top perspective view of an exemplary gauge cleaning device.

FIG. 7 illustrates a top perspective view of a gauge cleaning device 700. Device view 700 includes platform 705 that can be made of steel or other various types of material which are known for their tensile strength and resistance to corrosion from hydrocarbons (e.g., crude oil, natural gas, gasoline, propane, diesel, kerosene, and butane). As an alternative to steel, hardened plastics, fiberglass and other material may be used to create platform 705. Platform 705 may include bolt aperture 740 at the proximal end of platform 705 and platform aperture 710 at the distal end of platform 705. Bolt aperture 740 may be sized to accommodate bolt 730 and may include threading to fit corresponding threading of a bolt 730. Platform aperture 710 may be sized to allow a gauging device such as a plumb bob to pass through.

Platform 705 may further include platform channel 715A that runs from an outside edge of platform 705 to an outside edge of platform aperture 710. Channel 715A may be sized to allow a gauge tape to pass from the outside of platform 705 to platform aperture 710. In an alternative embodiment, angular recess 770A and 770B may be located at an outside edge of platform 705 and wiper 720 to funnel a gauge tape to the entrance of platform channel 715A and wiper channel 715B. In another embodiment, an outcropping may be included on the outside edge of platform 705 to indicate and direct a gauge tape to the opening of channel 715A and channel 715B. Moreover, channels 715A and 715B may have various angles before opening to platform aperture 710 and wiper aperture 725. This may be done to position a gauge tape to be wiped clean within channels 715A and 715B.

Device view 700 may include wiper 720 attached to the bottom portion of platform 705. Wiper 720 may alternatively be attached to the top portion of platform 705. Wiper 720 may include a wiper aperture 725 and wiper channel 715B. Platform aperture 710 and wiper aperture 725 may be circular. The distance from the outside edge of platform aperture 710 to wiper aperture may range from 1 to 20 mm (e.g., wiper aperture 725 may be 23 mm in diameter and platform aperture 710 may be 30 mm in diameter). Further, wiper aperture 725 may be centered in platform aperture 110 such that an outside edge of platform aperture 710 is equal distance to an outside edge of the wiper aperture 725. Wiper aperture 725 may be a smaller aperture than that of platform aperture 710 found in platform 705. Wiper aperture 725 in wiper 720 may include a diameter smaller than a plumb bob being used while gauging in order to contact the plumb bob as it is being pulled through wiper aperture 725 and may include a flexible material, such as rubber, which allows a plumb bob with a larger diameter than wiper aperture 725 to pass through while also maintaining contact with the plumb bob to wipe away residual material from the plumb bob. For example, as a plumb bob is pulled through wiper aperture 725, wiper 720 contacts the plumb bob and platform 705 causing wiper 720 to bend. This allows wiper 720 to wipe off excess material from the plumb bob. Channels 715A and 715B may extend through platform 705 and through wiper 720. Wiper channel 715B may be narrower than platform channel 715A. Wiper 720 may be connected to platform 705 using attachments 735 A-735C. Attachments 735 A-C may include but are not limited to screws, bolts, rivets, and/or adhesives. Further attachments 735 A-735C may include apertures that extend through both platform 705 and wiper 720.

Device view 700 may further include clamp 745 to facilitate attachment to the corresponding storage tank/receptacle. Clamp 745 may include clamp body 760 distal arm 750 and proximal arm 755. Clamp body 760 may include bolt aperture 765 that may accommodate bolt 730. Distal arm 750 may be longer than proximal arm 755 allowing pressure to be applied at the proximal end when bolt 730 is tightened. Clamp 745 may attach to a projection in a tank. The projection, welded or attached to the tank, may include an upward turned lip that corresponds to the downward turned proximal arm 755. Alternatively, a tank may include another type of projection and the sizes of arms 750 and 755 may be adjusted to fit the shape of another type of projection. In an alternative embodiment, proximal arm 755 may be eliminated and distal arm 750 may be shortened to correlate to the width of the projection in the tank. Both distal and proximal arms 750 and 755 may be placed at substantially perpendicular to the length of clamp body 760 extending downward towards the top portion of platform 705. Substantially in this context means plus or minus 15 degrees. Distal arm 750 ends before the outer edge of platform aperture 710. Alternatively, the shape of clamp 745 may be altered to allow clamp 745 to attach to a lip in an opening of the storage tank or other receptacle.

Device FIG. 700 may include brush 775 attached to the one or more of the topside or bottom side of platform 705 such that the bristles of brush 775 cover platform aperture 710. Also, brush 775 may be attached to one or more of the topside or bottom side of wiper 720. Brush 775 may include bristles made of plastic, fiberglass, rubber, or other noncorrosive materials. Brush 775 may help to wipe off residue on either the gage tape or the plumb bob that may have been missed by wiper 720 or wiper channel 715B. Brush may be made of a variety of material types that are flexible and resistance to corrosion from hydrocarbons know to the art. The corrosive chemicals may include one or more of crude oil, natural gas, gasoline, propane, diesel, kerosene, and butane. Brush 775 may be attached by adhesive rivets bolts or other means known in the art.

Figure 8:
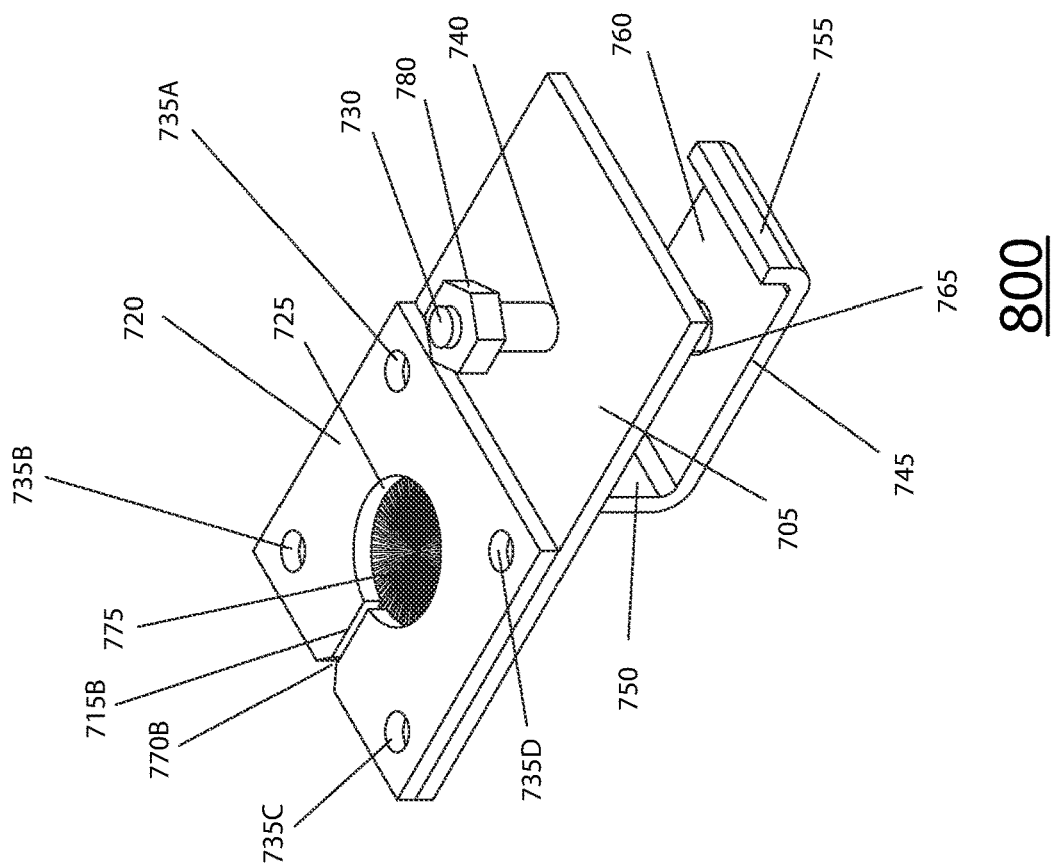
FIG. 8 Illustrates a bottom perspective view of an exemplary gauge cleaning device.

FIG. 8 illustrates a bottom perspective view of a gauge cleaning device 800. Device view 800 includes platform 705 that can be made of steel or other various types of material known to the art for their tensile strength and resistance to corrosion from hydrocarbons e.g., crude oil, natural gas, gasoline, propane, diesel, kerosene, butane. As an alternative to steel, hardened plastics, fiberglass and other material may be used to create platform 705. Platform 705 may include bolt aperture 740 at the proximal end of platform 705 and platform aperture 710 (hidden due to perspective) at the distal end of platform 705. Bolt aperture 740 may be sized to accommodate bolt 730 and may include threading to fit corresponding threading of a bolt 730. Alternatively, bolt 730 may include nut 780 attached to the bottom of bolt 730 located on the bottom portion of platform 705. Platform aperture 710 may be sized to allow a gauging device such as a plumb bob to pass through.

Platform 705 may further include channel 715A that runs from an outside edge of platform 705 to an outside edge of platform aperture 710. Channel 715A may be sized to allow a gauge tape to pass from the outside of platform 705 to platform aperture 710. In an alternative embodiment, angular recess 770A and 770B may be located at an outside edge of platform 705 and wiper 720 to funnel a gauge tape to the entrance of platform channel 715A and wiper channel 715B. In another embodiment, an outcropping may be included on the outside edge of platform 705 to indicate and direct a gauge tape to the opening of channel 715A and channel 715B. Moreover, channels 715A and 715B may have various angles before opening to platform aperture 710 and wiper aperture 725. This may be done to position a gauge tape to be wiped clean within channels 715A and 715B.

Device view 800 may include wiper 720 depicted attaching to the bottom portion of platform 705. Wiper 720 may alternatively be attached to the top portion of platform 705. Wiper 720 may include a wiper aperture 725 and wiper channel 715B. Wiper aperture 725 may be a smaller aperture than that of platform aperture 710 found in platform 705. Wiper aperture 725 in wiper 720 may include a diameter smaller than a plumb bob being used while gauging in order to contact the plumb bob as it is being pulled through wiper aperture 725. For example, as a plumb bob is pulled through wiper aperture 725, wiper 720 contacts the plumb bob and platform 705. This may cause wiper 720 to bend helping wiper 720 to wipe off excess material from the plumb bob. Channels 715A and 7158 may extend through platform 705 and wiper 720 respectively. Wiper channel 7158 may be narrower than platform channel 715A. This may be implemented to allow wiper 720 to contact a gauge tape and wiper channel 7158 as the gauge tape is pulled upwards through wiper channel 7158 wiper 720 may bend against channel 715A to wipe clean excess residue. Wiper 720 may be connected to platform 705 using attachments 735 A-D. Attachments 735 A-D may include but are not limited to screws, bolts, rivets, and/or adhesives. Further attachments 735 A-D may include apertures that extend through both platform 705 and wiper 720.

Device view 800 may further include clamp 745 to facilitate attachment to the corresponding storage tank/receptacle. Clamp 745 may include clamp body 760 distal arm 750 and proximal arm 755. Clamp body 760 may include bolt aperture 765 that may accommodate bolt 730. Distal arm 750 may be longer than proximal arm 755 allowing pressure to be applied at the proximal end when bolt 730 is tightened. Clamp 745 may attach to a projection in a tank. The projection, welded or attached to the tank, may include an upward turned lip that corresponds to the downward turned proximal arm 755. Alternatively, a tank may include another type of projection and the sizes of arms 750 and 755 may be adjusted to fit the shape of another type of projection.

In an alternative embodiment, proximal arm 755 may be eliminated and distal arm 150 may be shortened to correlate to the width of the projection. Both distal and proximal arms 750 and 755 may be attached at substantially perpendicular to the length of clamp body 760 extending downward towards the top portion of platform 705. Substantially in this context means plus or minus 15 degrees. Distal arm 750 ends before the outer edge of platform aperture 710 (unseen due to perspective). Alternatively, the shape of clamp 745 may be altered to allow clamp 745 to attach to the lip in an opening of the storage tank or other receptacle.

Device FIG. 800 may include brush 775 attached to the one or more of the topside or bottom side of platform 705 such that the bristles of brush 775 cover platform aperture 710. Also, brush 775 may be attached to one or more of the topside or bottom side of wiper 720. Brush 775 may include bristles made of plastic, fiberglass, rubber, or other materials that may be considered noncorrosive. Brush 775 may help to wipe off residue on either the gage tape or the plumb bob that may have been missed by wiper 720 or wiper channel 715B. Brush may be made of a variety of material types that are flexible and resistance to corrosion from hydrocarbons know to the art. The corrosive chemicals may include one or more of crude oil, natural gas, gasoline, propane, diesel, kerosene, and butane. Brush 775 may be attached by adhesive rivets bolts or other means known in the art.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A device comprising:
   a platform, the platform comprising;
     a first aperture disposed within the platform,
     a first channel disposed within the platform, wherein the first channel runs from an outside edge of the platform to an outside edge of the first aperture;
   a wiper attached to the platform, the wiper comprising;
     a second aperture disposed within the wiper, wherein the second aperture disposed within the wiper is smaller in size than the first aperture disposed within the platform, and a second channel disposed within the wiper, wherein the second channel runs from an outside edge of the wiper to an outside edge of the second aperture.

2. The device of claim 1, wherein the first aperture and the second aperture are both circularly shaped.

3. The device of claim 1, wherein the wiper is attached on a bottom portion of the platform beneath the first aperture.

4. The device of claim 1 further comprising:
a brush attached to the platform.

5. The device of claim 4, wherein the second aperture is centered in first aperture such that an outside edge of the first aperture is equal distance to an outside edge of the second aperture.

6. The device of claim 5, wherein the brush attached to the platform further includes bristles.

7. The device of claim 6, wherein the bristles cover the first aperture disposed within the platform.

8. The device of claim 1, wherein the first channel is positioned above the second channel.

9. The device of claim 1 where in the first channel is wider than the second channel.

10. The device of claim 1 further includes a clamp attached to the platform.

11. The device of claim 10, wherein the clamp further comprises:
a body,
a proximal arm attached to a first end of the body, and
a distal arm attached to a second end of the body.

12. A device comprising:
a platform, the platform comprising;
a first aperture disposed within the platform,
a first channel disposed within the platform, wherein the first channel runs from an outside edge of the platform to an outside edge of the first aperture;
a wiper attached to the platform, the wiper comprising;
a second aperture disposed within the wiper, wherein the second aperture disposed within the wiper is smaller in size than the first aperture disposed within the platform,
a second channel disposed within the wiper, wherein the second channel runs from an outside edge of the wiper to an outside edge of the second aperture; and
a brush attached to the platform, the brush comprising:
bristles.

13. The device of claim 12, wherein the first aperture and the second aperture are both circularly shaped.

14. The device of claim 12, wherein the wiper is attached on a bottom portion of the platform beneath the first aperture.

15. The device of claim 14, wherein the second aperture is centered in first aperture such that an outside edge of the first aperture is equal distance to an outside edge of the second aperture.

16. The device of claim 12, wherein the first channel is positioned above the second channel.

17. The device of claim 12, where in the first channel is wider than the second channel.

18. The device of claim 12, further includes a clamp attached to the platform.

19. The device of claim 18, wherein the clamp further comprises:
a body,
a proximal arm attached to a first end of the body, and
a distal arm attached to a second end of the body.

20. The device of claim 19, wherein the proximal arm is shorter in length than the distal arm.

\* \* \* \* \*